(12) United States Patent
Soomro et al.

(10) Patent No.: US 9,131,407 B2
(45) Date of Patent: Sep. 8, 2015

(54) SYSTEM AND METHOD TO MEASURE DELAY FOR QOS MONITORING IN WLAN 802.11 NETWORKS

(75) Inventors: Amjad Soomro, Hopewell Junction, NY (US); Dave Cavalcanti, Ossining, NY (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 913 days.

(21) Appl. No.: 11/908,567

(22) PCT Filed: Mar. 14, 2006

(86) PCT No.: PCT/IB2006/050800
§ 371 (c)(1),
(2), (4) Date: Sep. 13, 2007

(87) PCT Pub. No.: WO2006/097899
PCT Pub. Date: Sep. 21, 2006

(65) Prior Publication Data
US 2009/0122711 A1    May 14, 2009

Related U.S. Application Data
(60) Provisional application No. 60/661,435, filed on Mar. 14, 2005.

(51) Int. Cl.
*G01R 31/08* (2006.01)
*H04W 28/18* (2009.01)
(Continued)

(52) U.S. Cl.
CPC .......... *H04W 28/18* (2013.01); *H04L 43/022* (2013.01); *H04L 43/0852* (2013.01); *H04L 47/10* (2013.01); *H04L 47/115* (2013.01); *H04L 47/14* (2013.01); *H04L 47/2416* (2013.01); *H04L 47/25* (2013.01); *H04L 47/283* (2013.01); *H04W 24/00* (2013.01); *H04W 28/14* (2013.01); *H04W 28/24* (2013.01)

(58) Field of Classification Search
USPC ................................. 370/338, 445, 455, 328
See application file for complete search history.

(56) References Cited

U.S. PATENT DOCUMENTS 6,141,325 A * 10/2000 Gerstel ......................... 370/238
6,687,223 B1    2/2004 Sajadieh
(Continued)

FOREIGN PATENT DOCUMENTS

EP    1225734 A2    7/2002
JP    2002135329 A    5/2002
(Continued)

OTHER PUBLICATIONS

Luo, A. et al "Bandwidth Allocation for Multiservice Access on EPONs", IEEE Communications Magazine Feb. 2005, vol. 43, No. 2, pp. S16-S21.
(Continued)

*Primary Examiner* — Jung-Jen Liu
(74) *Attorney, Agent, or Firm* — Larry Liberchuk

(57) ABSTRACT

A wireless network (100) includes a plurality of wireless stations (QSTAs) (102) and an access point (QAP) (101). The QAP, or one or more of the QSTAs, or both, measure delay data, or queue data, or both, per one or more traffic type. A network parameter of the QSTA or QAP can be adjusted based on the measured delay data, queue length, or both. A method of wireless communication is also described.

16 Claims, 6 Drawing Sheets

(51) Int. Cl.
*H04L 12/26* (2006.01)
*H04L 12/801* (2013.01)
*H04L 12/853* (2013.01)
*H04L 12/825* (2013.01)
*H04L 12/841* (2013.01)
H04W 24/00 (2009.01)
H04W 28/14 (2009.01)
H04W 28/24 (2009.01)

(56) References Cited

U.S. PATENT DOCUMENTS

| | | | |
|---|---|---|---|
| 6,807,156 | B1 | 10/2004 | Veres |
| 6,901,046 | B2* | 5/2005 | Hsu et al. ............... 370/204 |
| 7,072,961 | B1* | 7/2006 | Maclean et al. ......... 709/224 |
| 7,099,283 | B2* | 8/2006 | Matta et al. ............. 370/252 |
| 7,570,624 | B2* | 8/2009 | Shapira ................... 370/338 |
| 7,616,685 | B2* | 11/2009 | Fimoff et al. ........... 375/232 |
| 2002/0089994 | A1* | 7/2002 | Leach et al. ............ 370/412 |
| 2004/0170150 | A1* | 9/2004 | Guo et al. ............... 370/338 |
| 2004/0185786 | A1 | 9/2004 | Mirbaha |
| 2006/0187873 | A1* | 8/2006 | Friday et al. ........... 370/328 |
| 2008/0089241 | A1* | 4/2008 | Lloyd et al. ............ 370/253 |

FOREIGN PATENT DOCUMENTS

| | | |
|---|---|---|
| JP | 2004135065 A | 4/2004 |
| KR | 20040075578 A | 8/2004 |
| WO | WO03053011 A1 | 6/2003 |
| WO | WO2004077225 A2 | 9/2004 |

OTHER PUBLICATIONS

Siris, V.A. et al "Achieving Service Differentiation and High Utilization in IEEE 802.11", Technical Report 322, Jun. 2003, pp. 1-17.

Scarpa V. et al "Adaptive Techniques to Guarantee QoS in a IEEE 802.11 Wireless LAN" Vehicular Technology Conf. 2004, pp. 3014-3018.

Mangold S. et al "IEEE 802.11E Wireless LAN for Quality of Service" Feb. 2002 XP002251598.

* cited by examiner

SYSTEM AND METHOD TO MEASURE DELAY FOR QOS MONITORING IN WLAN 802.11 NETWORKS

The use of wireless connectivity in data and voice communications continues to increase. To this end, the wireless communication bandwidth has significantly increased with advances of channel modulation techniques, making wireless local area networks (WLANs) a viable alternative to wired and optical fiber solutions.

As is known, standards often govern WLANs. One such standard is IEEE 802.11. IEEE 802.11 is a standard that covers the specification for the Medium Access Control (MAC) sub-layer and the Physical (PHY) layer of the WLAN.

While the 802.11 standard has provided for significant improvement in the control of voice and data traffic, the continued increase in the demand for network access at increased channel rates while supporting quality-of-service (QoS) requirements has resulted a continuous evaluation of the standard and certain changes thereto. For example, much effort has been placed on support for real-time multimedia services in WLAN's (e.g., streaming video), as well as the continued support of legacy voice and data traffic in the network. IEEE 802.11E addresses these issues to some extent.

The 802.11E standard arose out of the need to transmit multimedia and legacy traffic over a common channel. As can be appreciated, multimedia traffic requires different amounts of bandwidth, and different access latency time to the channel than many legacy applications. In an attempt to improve the efficiency of a network through coordination of access to the medium, the access point (QAP) or host of the network grants access to the medium by one of a variety of methods. This granting of access to the medium is based on criteria, and is often referred to as service differentiation.

One technique used to attempt to coordinate the access/use of the operating channel of the WLAN is polling. Polling is a process where a wireless station (QSTA) sends a transmission to the QAP with certain requirements such as the stream requirements. Each QSTA will transmit the requirements of an application to the QAP, which reserves the medium (channel) according to requirements. In this manner, access to the medium is granted by specific access requirements, rather than by general application type. This type of medium access reservation is referred to as traffic specification (TSPEC) negotiation and is a type of service differentiation.

After receiving the request, the QAP then either rejects the request or accepts it. The QSTAs with accepted streams are issued polls which are effectively a granting of grant channel access rights for the indicated duration.

Another prioritization method is contemplated in the 802.11E standard. This method categorizes applications into traffic classes and each class has different priority of access. In this method each class of traffic, or traffic type, has different probability of access to the channel than lower priority traffic.

While the methods of service differentiation (channel access granting or channel priority) outlined above have increased the capabilities of wireless systems significantly, increased application requirements require further improvements. One known improvement is through monitoring and measurement of various channel state data that are embodied in proposed amendments 802.11H and 802.11K.

The proposed 802.11H amendment includes monitoring of the frequency to ensure that certain radar devices are not transmitting. If these devices are transmitting, the QAP requires the QSTAs to change to a different channel frequency, for example, to avoid interfering with the radar.

The proposed 802.11K amendment includes monitoring and measuring information regarding neighboring QAPs by the present QAP; information about nodes hidden from the QAP or other QSTAs; and noise histograms that are acquired over defined time periods.

The measuring and monitoring techniques of 802.11H and 802.11K can be useful in improving the network manageability in wireless networks. However, these known network measuring and monitoring techniques are not adept to the needs of service-differentiated networks. For example, current measuring and monitoring methods fail to differentiate between different types of traffic.

IEEE 802.11k (e.g. section IEEE 802.1t tgK-D4.0 section 7.3.2.22.10, entitled *QoS Metrics Report*) calls for monitoring, storing, requesting and reporting of data in service differentiated wireless networks. This allows QSTAs to report measured statistics to the QAP, including management information base (MIB) counters defined in legacy 802.11 networks, for example 802.11e MIB. However, this measurement calls for a general technique of measuring average delay. This is not optimal for implementation in 802.11 devices. For example, in order to compute the average delay of n samples using the standard method, the QSTA would have to store n values and perform n−1 additions and one division. Thus, depending on the number of samples required, the standard method may result in large memory and computation requirements. Consequently this may drain power resources in a mobile device where batter life is at a premium.

According to the prior art methods, in order to keep the average delay measurement current, a QSTA would have to update the average delay for every new successfully transmitted frame or for every frame discarded because the retry limit has been reached or the delay bound missed. An update in the prior art requires a high computation and storage cost for keeping average delay updated, especially in high traffic rates.

Illustratively, the data are delay data and queue data. In example embodiments, the delay data or queue data, or both, may be collected per access category, per traffic stream, per user priority or per station. It is noted that these traffic types are merely illustrative and these data may be collected for other traffic types that are within the purview of the artisan of ordinary skill in the wireless arts.

Beneficially, the access to the data enables a QSTA or a QAP to know the level of the QoS being achieved and the knowledge of the system state (delays, queue lengths, etc). Moreover, with these data, the QAP may recognize a problem (delay or unacceptable queue length) that is occurring, or that may occur if a trend continues; where the problem is occurring; and the magnitude of the problem. The QAP may then take corrective or mitigating steps to attempt to resolve the problem. In addition, with these data, a QSTA may make certain decisions, such as the decision to join a neighboring network, or to request a greater amount of time to access the medium.

What is needed therefore is a method, device, and computer readable medium for wireless communication that overcomes at least the shortcomings of known methods and apparati described above.

In accordance with an example embodiment, a wireless network includes a MAC; a PHY; a processor for measuring a QoS parameter; an event sampler for sampling an instance of the QoS parameter; a device for storing a previously-calculated QoS parameter; a means for adjusting the previously-calculated QoS parameter based on the measured QoS parameter; and a controller for adjusting at least one network parameter of the MAC, the PHY, or both the MAC and the PHY.

In accordance with another example embodiment, a method of wireless communication includes measuring a QoS metric parameter in a sampling operation; storing the measured QoS metric parameter in a memory; updating an average of a series of QoS metric parameters based on the stored measured QoS metric parameter; and adjusting at least one network parameter based at least in part on said updated average.

The example embodiments are best understood from the following detailed description when read with the accompanying drawing figures. It is emphasized that the various features are not necessarily drawn to scale. In fact, the dimensions may be arbitrarily increased or decreased for clarity of discussion.

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention. Wherever possible, like numerals refer to like features throughout.

Figure 1:
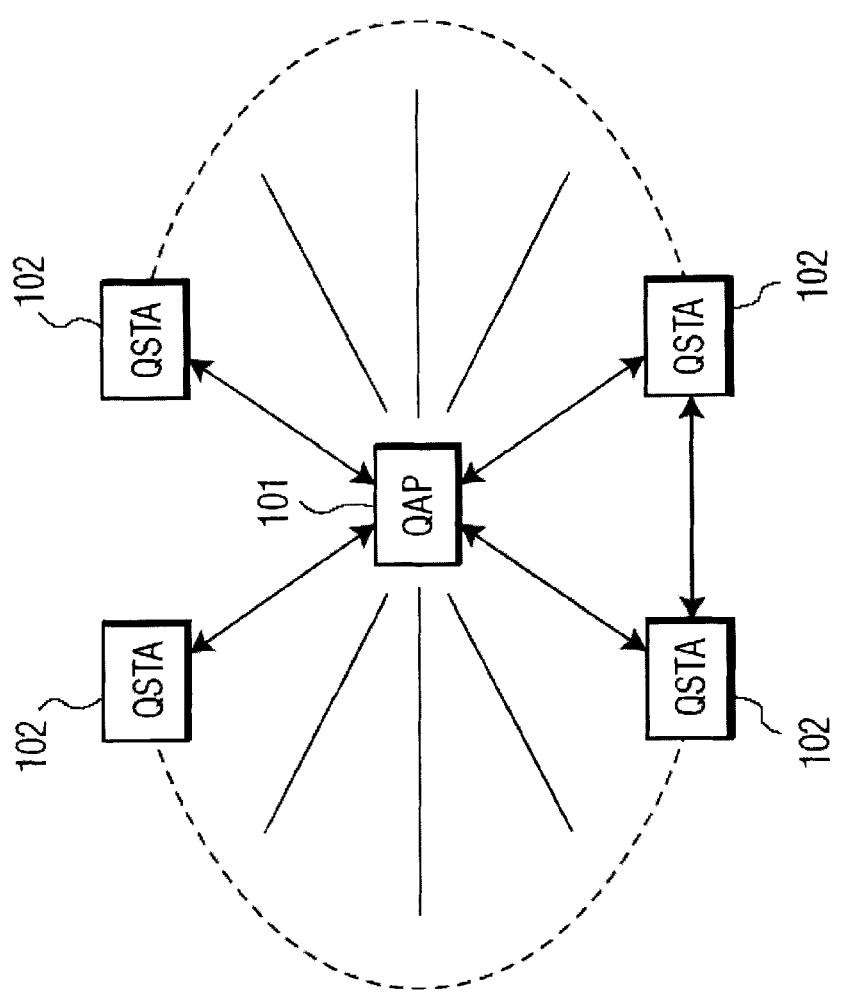
FIG. 1 is a block diagram of a wireless local area network in accordance with an example embodiment.

FIG. 1 shows a network 100 in accordance with an example embodiment. The network 100 includes at least one QAP 101, which is connected by wireless infrastructure (not shown) to a plurality of QSTA's 102. It is noted that in the example embodiment four QSTA's 102 are shown. This is done to promote clarity in the discussion of the example embodiments.

The QSTA's 102 are illustratively portable devices such as personal computers, consumer appliances, handsets, personal digital assistants (PDAs) and other devices usefully connected via a network. In accordance with example embodiments, the network 100 and its elements substantially comply with the IEEE 802.11 standard, and its progeny. Illustratively, the network 100 is a WiFi network or other type of wireless local area network (WLAN). The network 100 also includes the modifications and improvements of the example embodiments of the present application.

In operation the QAP 101 dictates the communications between the various QSTAs 102. To this end, the QAP 101 coordinates the transmission of voice, video and data by the QSTAs 102. In accordance with an example embodiment the QSTAs 102 are connected to one another only through the QAP 101. In accordance with another example embodiment, the QSTA's may be in communication with one or more QSTA's without having to transmit first to the QAP 101. The former embodiment is referred to as an uplink, while the latter is referred to as a direct link. While the details of these aspects of the WLAN 100 are germane to a general understanding of the example embodiments, these details are generally known to one of ordinary skill in the art. As such, these details are not included so as to avoid obscuring the description of the example embodiments.

Figure 2:
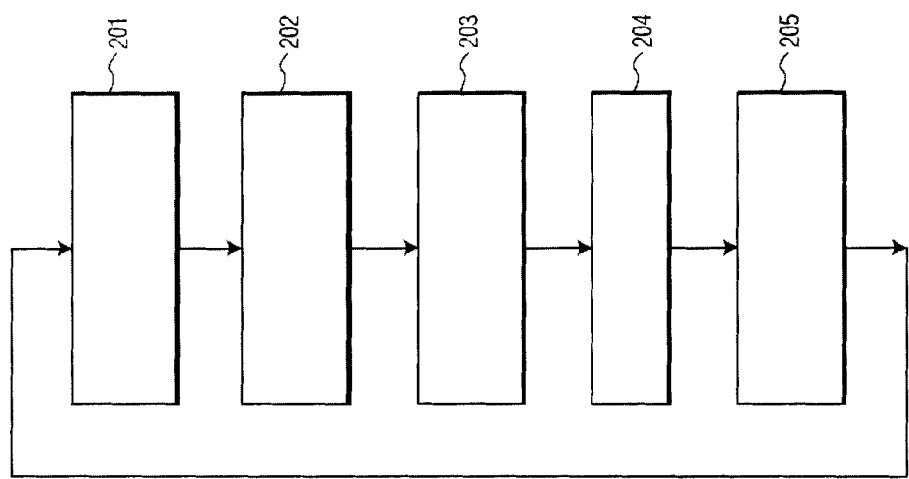
FIG. 2 is flow chart of a method of acquiring and storing delay, or queue data, or both, in accordance with an example embodiment.

FIG. 2 is a flow chart of a method of acquiring and storing delay data, or queue data, or both, in accordance with an example embodiment. The method of FIG. 2 is described in conjunction with the network 100 of FIG. 1. It is emphasized that this is merely illustrative and it is contemplated that the present method may be implemented in other types of wireless networks. As referenced previously, the QAP 101 or QSTA(s) 102, or both, desirably acquire and store delay or queue data of a chosen traffic type or variety of traffic types. To this end, in certain example embodiments, the QAP acquires and stores delay or queue data. In other example embodiments, one or more of the QSTAs 102 acquires and stores delay queue data. In still other example embodiments, the QAP 101 and one or more of the QSTAs 102 acquire delay or queue data.

At step 201, the QAP 101 or the QSTA(s) 102 selects the statistic and measurement parameters. These parameters include, but are not limited to: the average delay, the maximum delay, the minimum delay, the standard deviation or variance of the delay, and a histogram of the delay. Similarly, the QAP 101 or QSTAs 102 may choose from the following statistic and measurement parameters in relation to the queue: the average queue length, the maximum queue length, the minimum queue length, the standard deviation or variance of the queue length, and a histogram of the queue length.

At step 202, the QAP 101 or the QSTAs 102, or both, acquire the desired data of the chosen parameters per a desired traffic type or plurality of traffic types. Again, these traffic types include, but are not limited to an access category, a traffic stream, a user priority or a station. The acquisition of the data is effected by monitoring the performance with respect to a particular parameter in a chosen traffic type. For example, the QAP 101 may monitor the delay per access category over a beacon interval or a service interval in order to determine the average delay in this interval. Alternatively, the acquiring of germane data may be effected through a request by one node of another node. For example, if the QAP desires delay or queue data related to a traffic type from a QSTA, it may acquire these data from the QSTA via a request.

At step 203, optionally, one or more of the QSTAs 102 transfer data acquired to the QAP 101. This transfer may be the result of a request for the transfer from the QAP 101 to the QSTA(s) 102; or may be an unsolicited transfer from the QSTA(s) 102 to the QAP 101.

At step 204 the QSTA 102 or the QAP 101 stores the relevant data. Moreover, if calculations are to be made, these may be effected at step 204. For example, the QAP 101 may desire a statistical mean of the queue length over a prescribed number of packets of data. During step 204, and after acquiring the data in step 202, the QAP 101 may calculate the mean.

At step 205, if necessary, based on the data acquired, the QAP 101 or QSTAs 102 may alter their function. The altering may be one of a variety of actions. Moreover, more than one action may be taken by the subject QSTA or QAP. Illustratively, if after acquiring data related to maximum delay, the QAP 101 determines that the maximum delay is well below a threshold permissible delay for streaming video, the QAP 101 may increase the time allocated to packets of other types of data (e.g., voice) that have a much lower threshold for maximum delay. By doing this, the streaming video may remain under its threshold maximum delay (albeit now with greater delay than before the curative action taken by the QAP), and other data can be more quickly communicated. Thereby, the throughput and efficiency with respect to these other types of data increases, without sacrificing the quality of the video communication.

Noteworthy is the fact that the acquisition and storing of data in steps 202 and 204 do not need to be completed before the action of step 205 is carried out. For example, if during the acquiring of the queue length of per access category a threshold limit nearing, the QAP 101 may take certain remedial action to avoid reaching or exceeding the threshold.

After completion of the remedial action of step 205, the process may be repeated as desired, beginning at step 201. It is noted, of course, that if action is taken before the completion of a particular time period or number of data points desired, the continued acquisition storage and analysis of data may continue per steps 202 and 204. Moreover, the illustrative method contemplates the parallel execution of steps 202-205 as needed.

Figure 3:
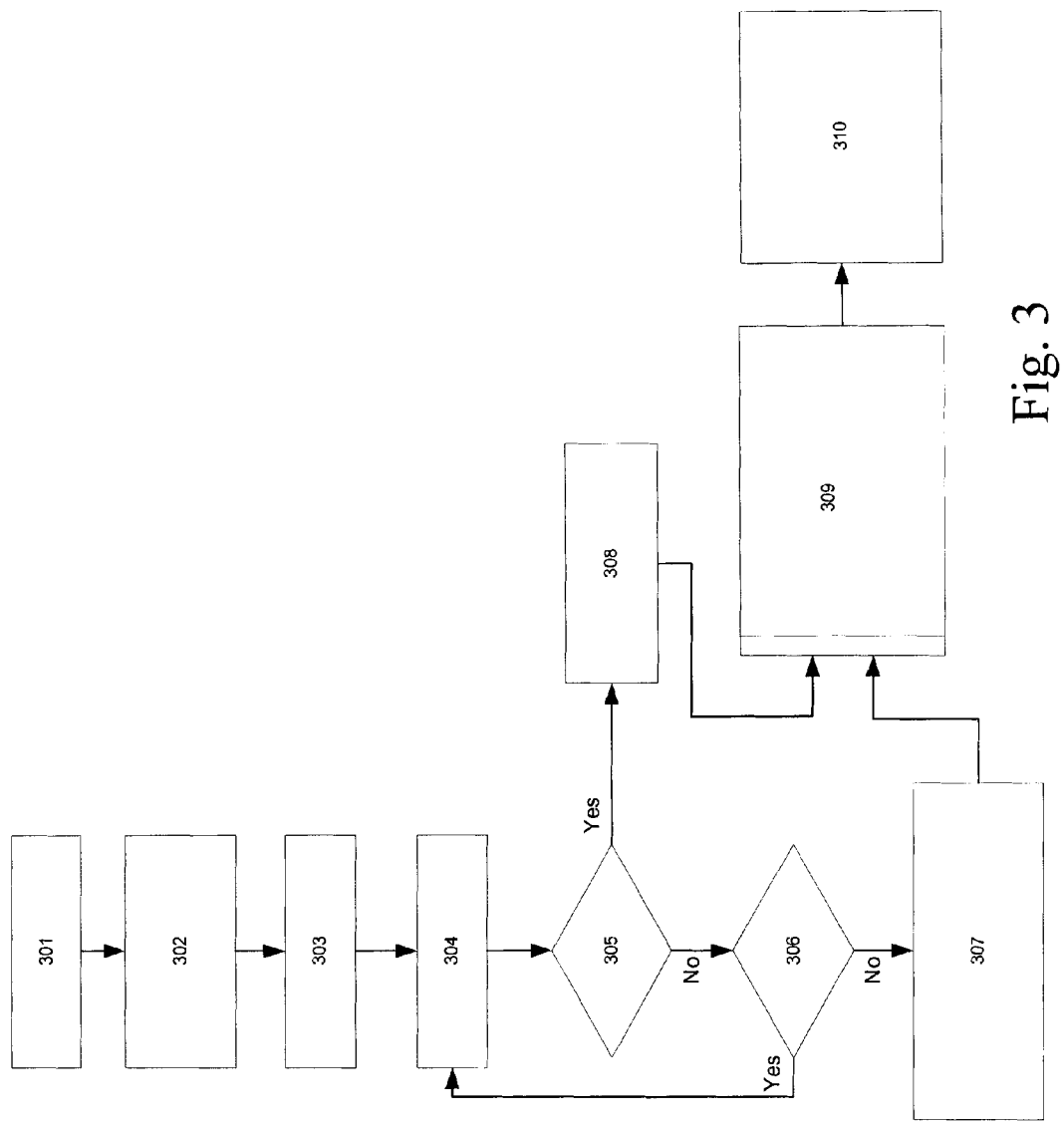
FIG. 3 depicts a flow chart diagram of a method for delay update processing using a prior art method.

FIG. 3 depicts a flow chart of a method for processing a delay update. In Step 301, the process starts. In Step 302 a QSTA or QAP initiates a delay measurement. The delay measurement can be a measurement of, for example, delay data (i.e., time of delay) or queue length (i.e., place in queue). In Step 303, the QSTA or QAP waits for a frame to transmit, and then transmits the frame in Step 304. The QSTA or QAP checks whether the frame was successfully transmitted in Step 305. This can be accomplished, for example, by receiving an acknowledgement frame (ACK) from the device with which the QSTA or QAP communicates. If the QSTA or QAP does not receive an ACK, it decides whether to retransmit the frame in step 306. This decision is based, for example, on whether a retry limit is reached. If the retry limit is achieved, the QSTA or QAP discards the frame in Step 307 and sets a delay limit to a value of:

$$d_k = (\text{current time}) - (\text{frame arrival time})$$

where $d_k$ represents the delay sample. If the retry limit is not achieved in step 306 the frame is retransmitted upon a return to Step 304. If, however a QSTA or QAP receives an ACK in step 305, the QSTA or QAP proceeds to step 308 and sets the frame delay to:

$$d_k = (\text{ACK reception time}) - (\text{frame arrival time})$$

QSTA or QAP stores every new delay sample $d_k$ from either step 307 or 308 as one of n in a series of samples. This storage requires memory space in the QSTA or QAP. A processor in the QSTA or QAP then updates the average delay in Step 310 by the following equation:
where D is the average delay, n is the number of samples, and d is the measured frame delay. In order to compute the average delay of n samples using the method of FIG. 3, the QSTA or QAP has to store n values and perform n−1 additions and one division in order to perform the computation. Depending on the number of samples required to determine average delay, this results in large memory requirements (e.g., to store all n samples) and high computation requirements (e.g., to perform the function above).

Figure 4:
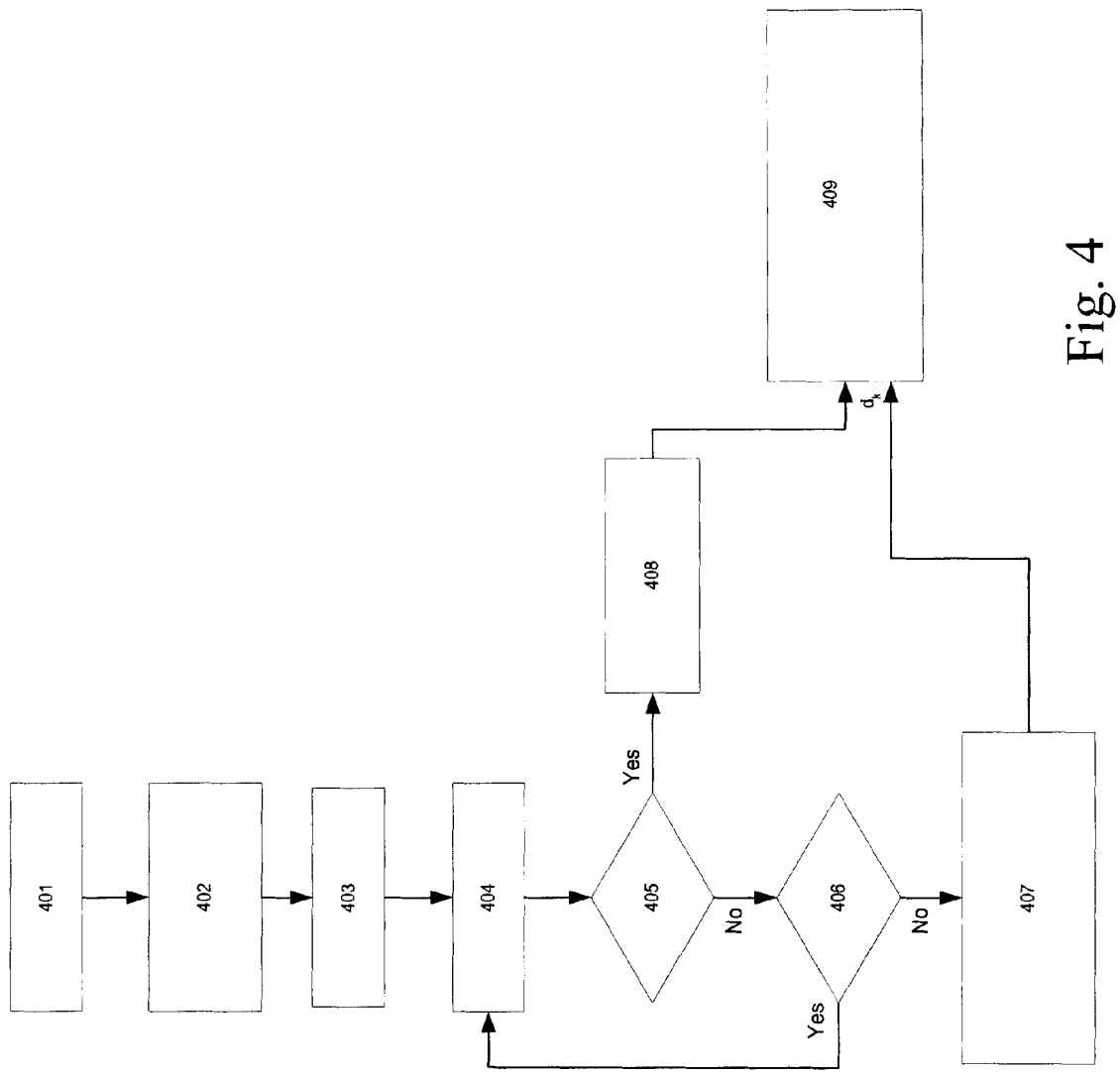
FIG. 4 depicts a flow chart diagram of a method of updating an average delay.

FIG. 4 depicts a method according to the invention where Steps 401-408 are identical to Steps 301-308 of FIG. 3 and will not be described herein for the sake of brevity. A processor within the QSTA or QAP generates an average delay measurement Step 409 in a simpler and more efficient way than the method described in reference to FIG. 3. In step 409, processor within the QSTA or QAP generates the average delay $D_k$ by using a moving average to estimate D after k numbers of samples according to the following equation 1:

$$D_k = (1-2^{-n})D_{k-1} + 2^{-n}d_k$$

Where $d_k$ is the measured delay for the $k^{th}$ frame successfully transmitted, for example, in a transmission stream in step 408. Additionally, $d_k$ can be set to the total amount of time the frame stayed in the MAC layer queue before being discarded (as per step 407) where n determines the weight given to the estimated value compared to the newly measured value.

Equation 1 can be rewritten as the following equation 2:

$$D_k = D_{k-1} + 2^{-n}[d_k - D_{k-1}]$$

Equation 2 requires only 3 basic operations in the processor within the QSTA or QAP at each update. These operations are one subtraction (e.g., $d_k - D_{k-1}$), on addition (e.g., the + operation), and one shift (e.g., $2^{-n}$ where n is a bit number). The demands on memory within the QSTA or QAP are much simpler than the method of FIG. 3 and require only the storage of two values (e.g., the estimated delay $D_{k-1}$ and the measured delay $d_k$). The demands on the processor within the QSTA or QAP are much simpler than the method of FIG. 3 and require only the three basic operations to be executed to determine the average delay from a sample update (e.g., one addition, one subtraction, and one shift). Additionally, a user can set the value of n depending on applications requirements (i.e., power saving, processing speed, relative weight of the previously sampled data etc.). Further, n could be predetermined or the QAP or QSTA could include the value of n in management frames, for example measurement request frames. Additionally, the estimated delay of Step 407 could be reported by QSTAs to the QAPs in, for example, STA statistics report frames defined in IEEE 802.11k draft D2.0.

A QAP can also send a measurement frame request to a QSTA to transmit is current estimated delay in a measurement response frame. The QAP would use this information, for example to optimize its scheduling policy.

Additionally, the delay estimated according to equation 2 could be defined as a new attribute, called dot11QosMSDUDelay in the dont11QosCounters table that provides QoS information in the current 802.11e MIB. With this information, the QSTAs would be able to identify how well the delay constraints are being met. For instance, the QSTAs would be able to identify an increasing trend in the delay towards the bound delay, which can be interpreted as an alarm for critical applications. Once the estimated delay reaches a given threshold (QoS alarm threshold), then, the QSTA could try to renegotiate QoS with the HC or take any other action to avoid packet loss.

Figure 5:
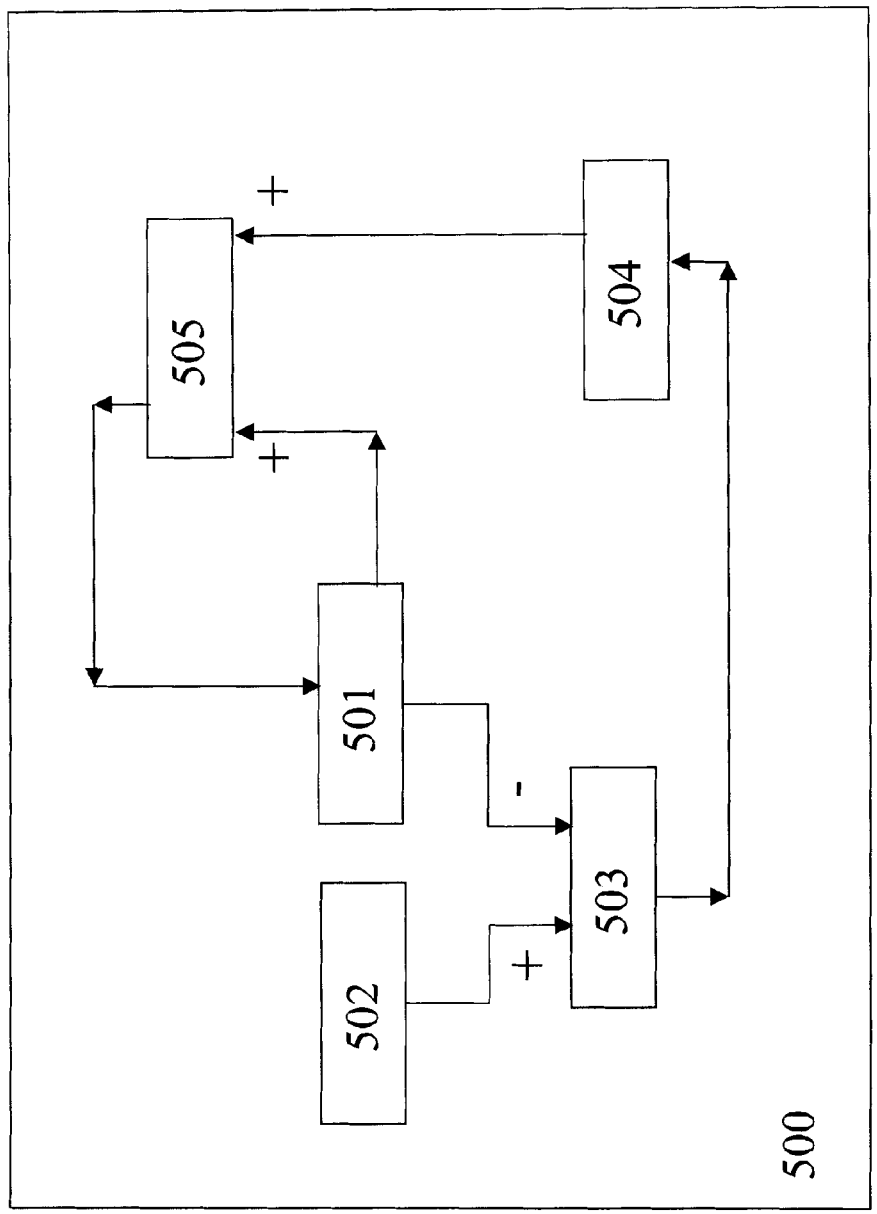
FIG. 5 depicts a device for determining an average delay.

FIG. 5 depicts a device for achieving the method depicted in FIG. 4. The device 500 includes a memory 501 for storing a value $D_k$ and a memory 502 for storing a value $d_k$. Subtractor 503 performs the subtraction operation from equation 2 by retrieving the values of $d_k$ and $D_k$ from memories 502 and 501 respectively. Right shifter 504 performs the shift operation of equation 2. Adder 505 adds the output of right shifter 504 and the stored value of $D_k$ from memory 501. Memory 501 then stores a new value for $D_k$ that has been updated according to equation 2.

Figure 6:
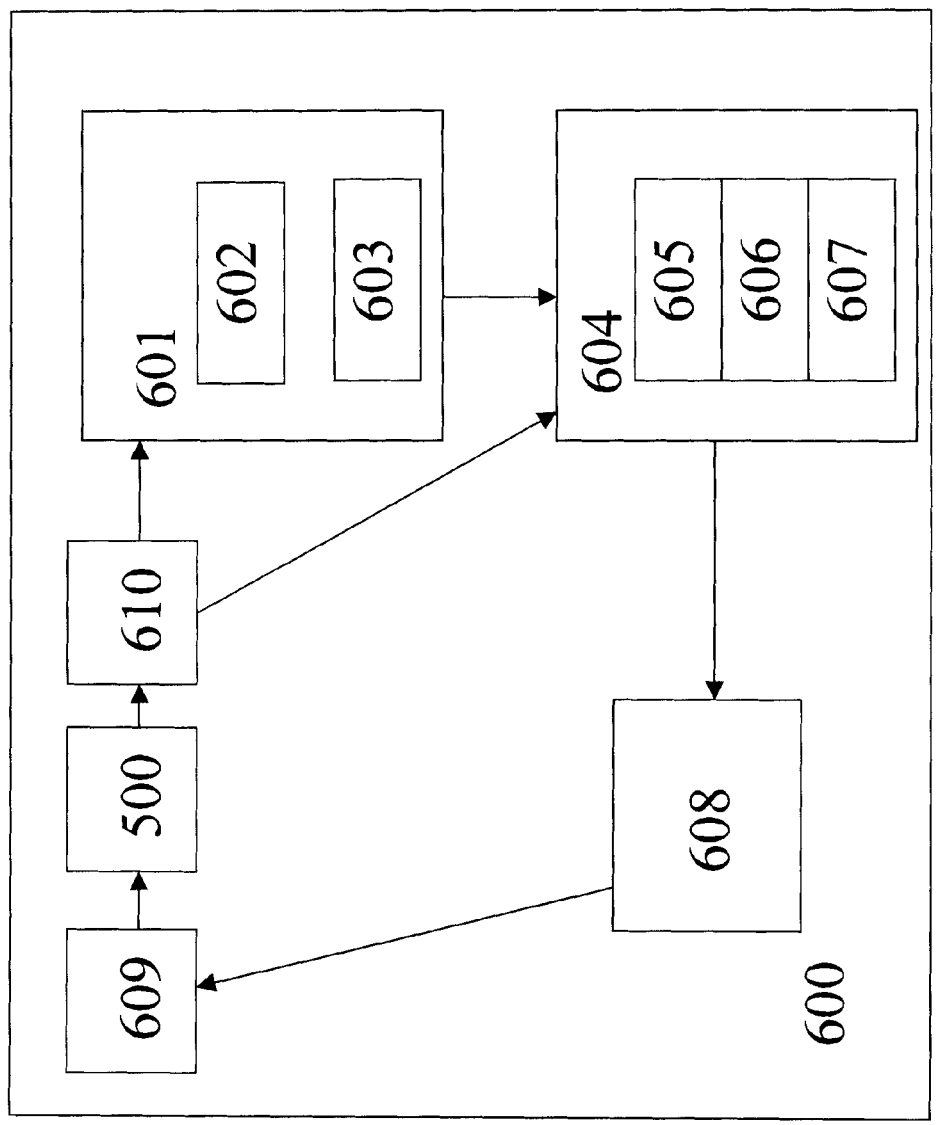
FIG. 6 depicts a device for adjusting a network parameter based on a measured QoS parameter.

FIG. 6 depicts a QSTA or QAP 600 including device 500. QSTA or QAP 600 includes a MAC control 601 that contains a memory 602 and processor 603. Either or both of the memory 602 and processor 603 may be situated outside of control 601 and be shared between the various elements of QSTA or QAP 600. MAC control 601 controls when the QSTA or QAP 600 accesses the network in which it operates. It directs PHY device 604 when to transmit or receive. MAC control 601 can be any MAC control known in the art. PHY device 604 includes antenna 605, transceiver 606, and power supply 607. Either or all of the antenna 605, transceiver 606, and power supply 607 may be located outside of PHY device 604 and be shared between the various elements of QSTA or QAP 600. PHY device 604 can be any PHY device known in the art. PHY device 604 is coupled to processor 608 which measures at least one QoS parameter such as delay data or queue length. Event sampler 609 samples processor 608 at specific instances to sample the QoS parameter. The sampled value is input into memory 502 as the valued $d_k$. The output value $D_k$ of device 500 is input into controller 610 that controls the network parameters of either or both of MAC control 601 and PHY device 604. MAC control 601 and/or PHY device 604 then adjust a network parameter of either the MAC or PHY based on the output of controller 610. Examples of network parameters include, for example, the scheduling policy, contention window minimum, contention window maximum, transmission opportunity, medium sensing time before transmission or decrementing back off counter.

As can be appreciated, delay and queue information for the desired traffic type(s) may be gathered, stored and used for remedial action in a network such as described in connection with the example embodiment of FIG. 1. Moreover, the method of the example embodiment of FIG. 2 may be used to effect the gathering, storage and use. In addition, the delay and queue data may be monitored and collected in response to external stimuli, such as a measurement request by a QAP to a QSTA or some higher level network protocol command from upper layers to a QSTA. Additionally, the delay and queue data may be monitored or collected in response to internal stimuli, such as network congestion, or periodic monitoring, to name only a few.

As referenced previously, there are a number of illustrative traffic types for which the delay and queue data may be gathered. There are clear benefits to the acquisition of these data. Some illustrative benefits are described presently through examples.

As is well-known, the access categories are classes of data types in the MAC layer that are defined under the 802.11 standard. These categories include, but are not limited to a video category, a best effort category, a voice category and a background traffic category. By knowing the delay or queue length of a particular access category, decisions may be made regarding further transmissions of data in the category. For example, if the queue length of a video category is too great, and from other monitored information, a QSTA is aware of another QAP, the QSTA may request the neighboring QAP of its (neighboring QAPs) capabilities or its current state. The QSTA may then decide to create an association with the neighboring QAP for servicing of the video data.

Another known traffic type is the traffic stream. The requirements of a traffic stream are transmitted by a QSTA in a TSPEC. As can be appreciated, the QAP can maintain a time slot for the requesting QSTA based on the requirements. Thus, a queue is maintained for each traffic stream. Measurements of the delay or queue of the traffic stream provide will benefit the QSTA in decision relative to future transmissions. It may be useful, for example, to request additional time from QAP or to change data rates.

Another known traffic type is differentiated based on the user priority (UP). The UP is mapped to an access category, normally with two UPs per access category in the MAC layer. As is known, each access category has a different probability of accessing the channel or medium. The UP is at a higher layer and is mapped to an access category. As can be appreciated, the knowledge of the delay or queue length per user priority can be used to more efficiently transmit data based on the user priority. For example, it may be desirable to transmit data belonging to a certain UP below a certain average delay value. By knowing actual delays being encountered in MAC for the UP, a MAC can then change network parameters to bring delays of the UP traffic within desirable limits.

Finally, the delay or queue length, or both, may be gathered per station, instead of per traffic type. In this illustrative embodiment fewer computational, storage and measurement resources are needed to collect the desired data. In this manner, the delay or queue length may be used by the QSTA or the QAP, or both, to determine any possible corrective action based on the data as discussed previously. For example, if a QSTA experiences an unacceptable delay, it may request a greater amount of time from QAP or may look for another QAP with which to create an association.

This invention is applicable to any wireless system or application that requires frequent QoS monitoring. With the simple mechanism to estimated delay, the stations can identify eventual problems with QoS supported and can take proactive actions to avoid unacceptable delays and packet losses.

In view of this disclosure it is noted that various methods, devices and networks described in conjunction with measuring and monitoring in wireless networks of the example embodiments can be implemented in hardware and software. Furthermore, the various methods, devices and parameters are included by way of example only and not in any limiting sense. In view of this disclosure, those skilled in the art can implement the various example methods, devices and networks in determining their own techniques and needed equipment to effect these techniques, while remaining within the scope of the appended claims.

The invention claimed is:

1. A method of determining quality of service (QoS) metrics in a wireless network, the method comprising:
    measuring a QoS metric parameter for each traffic type in a sampling operation;
    storing the measured QoS metric parameter in a memory;
    updating a moving average QoS metric parameter of a series of QoS metric parameters for at least one traffic type based on both the stored measured QoS metric parameter for a corresponding one of the at least one traffic type, the moving average for the QoS metric parameter that is based on values of a prior series of QoS metric parameters measured and stored prior to the stored measured QoS metric parameter, and a weighting factor;
    taking a remedial action to avoid reaching a QoS alarm threshold when the moving average QoS metric parameter for the corresponding one of the at least one traffic type reaches the QoS alarm threshold; and
    adjusting at least one network parameter for the at least one traffic type based at least in part on said updated moving average QoS metric parameter for the at least one traffic type.

2. The method of claim 1, wherein the QoS metric parameter comprises delay data, queue length, or both.

3. The method of claim 1, wherein the updating step further comprises an addition operation, a subtraction operation, and a shift operation according to the following equation:

$$D_k = (1-2^{-n})D_{k-1} + 2^{-n}d_k$$

wherein $D_k$ represents the moving average QoS metric parameter of a series of QoS metric parameters for a corresponding one of the at least one traffic type after k samples of the series of QoS metric parameters have been measured and stored, n represents a bit number for setting the weighting factor, and $d_k$ represents the measured QoS metric parameter for the corresponding one of the at least one traffic type for the $k^{th}$ frame successfully transmitted.

4. The method of claim 3, wherein the adjusting further comprises adjusting a scheduling policy, contention window minimum, contention window maximum, transmission opportunity limit, medium sensing time before transmission or decrementing back off counter.

5. The method of claim 4, wherein the adjusting occurs at an access point (QAP) or a wireless station (QSTA).

6. The method of claim 3, wherein the adjusting further comprises enacting a negotiation between an access point (QAP) and a wireless station (QSTA) to ensure QoS level is within a predetermined limit.

7. The method of claim 1, wherein the remedial action includes at least one of:
 renegotiating with a hybrid controller for a new QoS with respect to the at least one traffic type;
 creating an association between a station in said wireless network and an access point in a neighboring wireless network for servicing a determined type of traffic;
 changing network parameters by a MAC layer to bring a delay for user priority traffic within a specified limit;
 requesting, by a station in the wireless network from an associated access point in said wireless network, one of an allocation of a greater amount of time and a data rate change;
 creating an association between a station in said wireless network and an access point in a neighboring wireless network; and
 changing one or more network parameters to avoid packet loss.

8. The method of claim 1, wherein the bit number n is determined by the wireless network.

9. The method of claim 8, wherein the bit number n is communicated via one or more management frames within the wireless network.

10. The method of claim 9, wherein the one or more management frames are measurement request frames.

11. A device for regulating a QoS metric parameter, the device comprising:
 a MAC control;
 a PHY control;
 a processor that measures a QoS metric parameter for each traffic type;
 an event sampler for sampling an instance of the measured QoS metric parameter;
 a memory for storing a previously-calculated moving average QoS metric parameter of a series of QoS metric parameters for at least one traffic type;
 a device for adjusting the previously-calculated QoS metric parameter for the at least one traffic type based on a moving average of the measured QoS metric parameter and a weighting factor;
 a controller for adjusting, for the at least one traffic type, at least one network parameter of the MAC, the PHY, or both the MAC and the PHY based at least in part on said adjusted moving average QoS metric parameter for the at least one traffic type and said controller for taking a remedial action to avoid reaching a QoS alarm threshold when the moving average QoS metric parameter for the corresponding one of the at least one traffic type reaches the QoS alarm threshold.

12. The device of claim 11, wherein the remedial action includes at least one of:
 renegotiating with a hybrid controller for a new QoS with respect to the traffic type;
 creating an association between a station in said wireless network and an access point in a neighboring wireless network for servicing a determined type of traffic;
 changing network parameters by the MAC control to bring a delay for user priority traffic within a specified limit;
 requesting, by a station in the wireless network from an associated access point in said wireless network, one of an allocation of a greater amount of time and a data rate change;
 creating an association between a station in said wireless network and an access point in a neighboring wireless network; and
 changing one or more network parameters to avoid packet loss.

13. The device of claim 11, wherein the bit number n is determined by the wireless network.

14. The device of claim 13, wherein the bit number n is communicated via one or more management frames within the wireless network.

15. The device of claim 14, wherein the one or more management frames are measurement request frames.

16. A non-transitory computer readable medium having one or more executable instructions stored thereon, which when executed by a processor cause the processor to perform a method for determining quality of service (QoS) metrics in a wireless network, the method comprising:
 measuring a QoS metric parameter for each traffic type in a sampling operation;
 storing the measured QoS metric parameter in a memory;
 updating a moving average QoS metric parameter of a series of QoS metric parameters for at least one traffic type based on both the stored measured QoS metric parameter for a corresponding one of the at least one traffic type, the moving average for the QoS metric parameter that is based on values of a series of QoS metric parameters measured and stored prior to the stored measured QoS metric parameter, and a weighting factor;
 taking a remedial action to avoid reaching a QoS alarm threshold when the moving average QoS metric parameter for the corresponding one of the at least one traffic type reaches the QoS alarm threshold; and
 adjusting at least one network parameter for the at least one traffic type based at least in part on said updated moving average QoS metric parameter for the at least one traffic type.

* * * * *